Jan. 8, 1957   R. STEINITZ   2,776,468
TERNARY METAL BORIDE COMPOSITIONS
Filed June 22, 1953
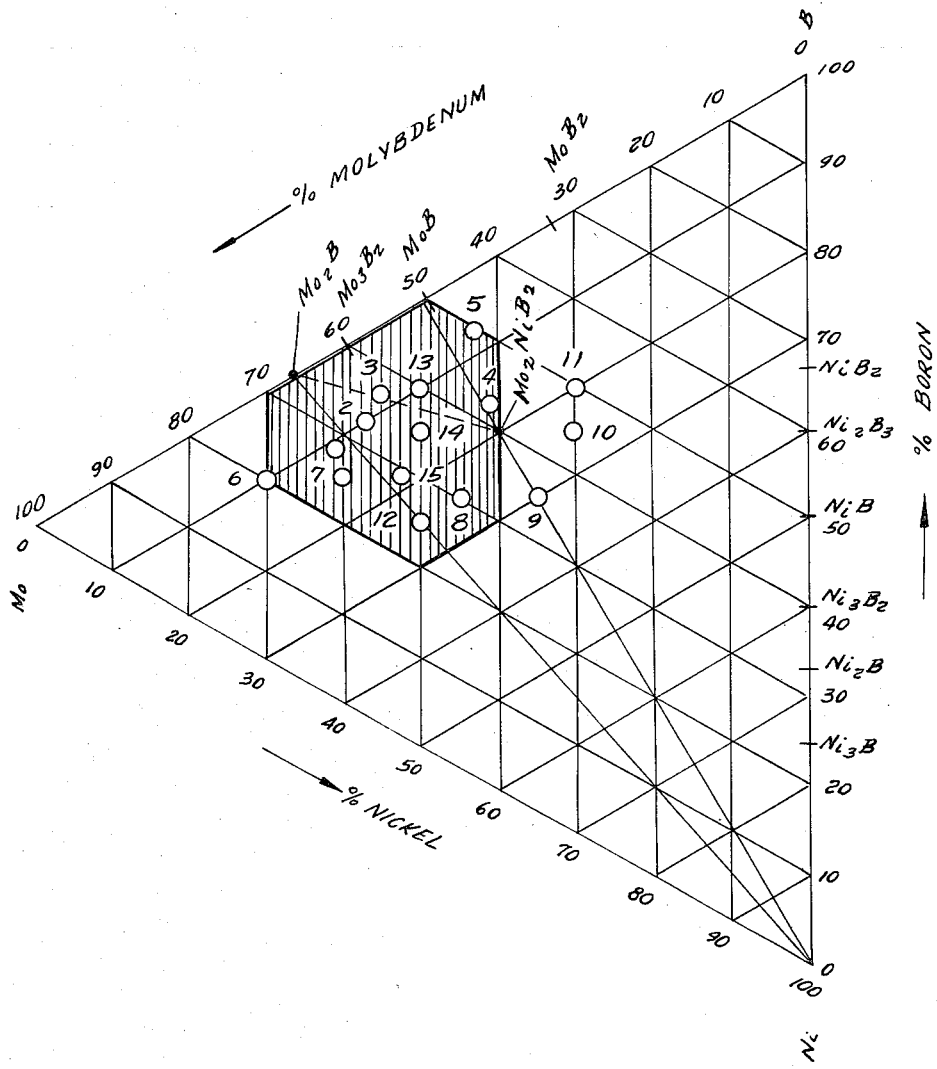
INVENTOR.
ROBERT STEINITZ
BY
Greene, Pineles & Durr
ATTORNEYS

2,776,468

TERNARY METAL BORIDE COMPOSITIONS

Robert Steinitz, New York, N. Y., assignor, by mesne assignments, to Borolite Corporation, Pittsburgh, Pa., a corporation of Delaware Application June 22, 1953, Serial No. 363,358

6 Claims. (Cl. 29—182.5)

This invention relates to novel ternary metal boride compositions and to their production.

Among the objects of this invention is to provide a metal boride composition which constitutes a hard body suitable for cutting tool material such as cutting edges or tool tips and the like.

In the past, tungsten carbide came into wide use as a tool material in the form of cemented carbide tool tips and the like. However, the tungsten of tungsten carbide is a strategically scarce material. Accordingly, many efforts have been made in the past to find another material which could be used in lieu of tungsten carbide in applications wherein tungsten carbide has been found extremely desirable.

The present invention is based on the discovery that it is possible to form ternary boride compounds containing two metals and boron which have very desirable properties for use in applications in which heretofore only tungsten carbide could be used to full advantage. (Throughout the specification and claims, all proportions are given by weight, unless otherwise specifically stated.)

More specifically, the present invention is based on the discovery that a ternary boride compound of the formula $Mo_2MeB_2$, wherein Me is either nickel or cobalt, may be readily produced, and that such compound may be utilized in lieu of tungsten carbide in applications where heretofore tungsten carbide was found essential. Thus, the desired ternary boride compounds are represented by the formula $Mo_2NiB_2$ or the formula $Mo_2CoB_2$.

It should be noted that these ternary compounds have a characteristic physical structure of their own, as can be determined by X-ray diffraction patterns, the crystalline structure of these compounds being somewhat similar to that of $Mo_3B_2$. In other words, these ternary metal borides distinguish fundamentally from solid solutions of two binary borides, for instance, a boride of molybdenum plus a boride of nickel, or a boride of molybdenum plus a boride of cobalt. In such solid solutions of different borides, the structure of one of the borides is preserved, while in the new ternary compound a new, unique crystal structure is formed.

This ternary boride compound is found not only in bodies made from molybdenum, nickel or cobalt, and boron in the exact stoichiometrical proportions represented by the formula $Mo_2MeB_2$, but is also present when molybdenum, nickel or cobalt and boron are combined in other proportions. However, in all satisfactory cutting tool materials of Mo-Ni-B or Mo-Co-B systems the compound $Mo_2NiB_2$ or $Mo_2CoB_2$ was identified by X-rays. The compound $Mo_2MeB_2$ is not reported in the literature.

The drawing shows a ternary diagram of the nickel, molybdenum, boron system in atomic percent.

The shaded area of the diagram of the drawing covers the proportions which are applicable to replace the tungsten carbides in tool applications.

By way of example, there are now given the properties of a body formed by hot-pressing a powder body of the molybdenum-nickel ternary boride compound per se. The body was hot-pressed at about 1600° C. to give a coherent, hard body having a density of 95% of the theoretical density of the ternary compound, the theoretical density being 8.4 grams per cubic cm. The resulting body had a hardness of 87 to 90 Rockwell A, and a resistivity of 90 micro-ohm cm. A ternary body with cobalt in place of nickel has substantially identical properties. Such ternary molybdenum-nickel- or molybdenum-cobalt-boride compounds have been found desirable for use in wear-resistant hard bodies such as cutting tools, and also to provide a hard, wear-resistant surface coating on metal bodies in applications in which heretofore tungsten carbide has been found essential. Since the ternary metal boride compounds of the invention do not require any strategically scarce tungsten, and have a specific weight only one-half of that of tungsten carbide, their advantages are obvious.

If powder particles of such ternary metal boride compositions are compacted and sintered at elevated temperatures, the resulting body exhibits excessive brittleness. A phase of the present invention is based on the discovery that such ternary metal boride compounds of the invention, when combined with a binary molybdenum boride of the formula $Mo_2B$, and sintered to form a cemented body of such two compositions, form a hard material of great strength exhibiting properties similar to those exhibited by the commercially available cemented tungsten carbide tool material. In general, these desirable ternary boride compounds in combination with the desired proportion of a binary boride, appear in compositions containing 70% to 30% molybdenum, 1% to 40% nickel, and 15% to 60% boron, these proportions being given in atomic percentages. Best results are obtained by combining the different ingredients to give a body containing 75% to 25% $Mo_2NiB_2$, in combination with 25% to 75% of $Mo_2B$. Within this range, extremely satisfactory results are obtained with bodies formed with about 50% $Mo_2NiB_2$, and about 50% $Mo_2B$ by weight. The ternary metal boride compound of the formula $Mo_2NiB_2$ and the binary boride compound of the formula $Mo_2B$ have each a relatively high melting point. However, when a compacted mixture of such powder particles is heated, there will form a liquid phase at a eutectic temperature, which is considerably lower than the melting point of either of the two compositions. As used herein, the expression "eutectic temperature" means the temperature at which a liquid phase appears in a mixture of two compositions which are not completely soluble in each other. This eutectic temperature is below 1300° C. in the case of the ternary boride $Mo_2NiB_2$ and the binary boride $Mo_2B$.

What was said above or is said below with respect to bodies formed with ternary molybdenum-nickel-boride compositions applies also to bodies formed with ternary molybdenum-cobalt-boride compositions. It is also possible to employ mixtures of the corresponding nickel or cobalt ternary compounds.

By way of example, I will now describe how to prepare a ternary molybdenum-nickel-boride compound, it being understood that a ternary molybdenum-cobalt-boride compound may also be prepared in a similar way.

The powders of the elements are mixed in the desired proportions corresponding to the formula. These powder mixtures are then compressed at room temperature to form compacts which are afterwards heated in a protective atmosphere such as hydrogen, to temperatures about 1500° C. to 1800° C., for ten minutes to one hour. After cooling, these compacts are crushed again to any desired particle size. The sintered body obtained from the compacting and sintering as just described is relatively brittle, and may be easily crushed into powder.

When producing a combined body out of a ternary molybdenum-metal-boride and a binary molybdenum boride, the procedure may be started with preparing any of the following powder mixtures:

(a) A powder mixture of molybdenum-nickel-boride plus powder of molybdenum-boride.

(b) A powder mixture of molybdenum-nickel-boride plus molybdenum-boride, plus nickel.

(c) A powder mixture of molybdenum-boride $Mo_2B$ plus nickel.

(d) A powder mixture of the molybdenum-boride MoB plus nickel.

(e) A powder mixture of $Mo_2NiB_2$ plus nickel, plus molybdenum, plus boron.

(f) A powder mixture of molybdenum plus boron plus nickel.

In general, it has been found to be advantageous to first prepare a ternary metal boride and a binary molybdenum boride, and to mix powders of the two borides in the desired proportions for use in making the desired composite hard metal body, or to start with a binary molybdenum boride and nickel.

If the desired composite body is formed out of molybdenum, boron and nickel by combining the metal ingredients with boron powder, the impurities usually contained in the commercially available boron material are driven off during the heating procedure, leaving resultant undesirable cavities in the sintered body.

There will now be described by way of example, a procedure of producing a hard composite body containing essentially as components a ternary molybdenum boride and a binary molybdenum boride.

There are prepared the ternary molybdenum-metalboride and the binary molybdenum boride $Mo_2B$ in powder form. The proper proportions of the ternary and binary borides in powder form are then mixed, and the mixing continued as by dry ball-milling or micronizing, to reduce the size of the powder particles of the component borides to about 1 to 3 microns. The powder mixture of the two borides is then compressed in a die with a pressure of about 1 to 5 t. s. i. (tons per square inch), and sintered in a hydrogen atmosphere for one to three hours at 1250° C. to 1600° C. In carrying on such compacting and sintering treatment, best results are obtained if the powder of the compacted and sintered body is kept out of contact with graphite.

In the course of the sintering treatment, the compacted body shrinks about 12–16% in linear dimensions.

The following examples illustrate different methods of preparing the products.

*Example 1*

A body corresponding to composition 1 on the drawing was prepared by combining 90 wt. percent of $Mo_2B$ and 10 wt. percent of Ni. This provides a composition having 85.5 wt. percent of Mo, 10.0 wt. percent of Ni, and 4.5 wt. percent of B, which corresponds to 60.5 atomic percent of molybdenum, 11.5 atomic percent of nickel, and 28.0 atomic percent of boron.

*Example 2*

A body corresponding to composition 2 on the drawing was prepared by combining 90 wt. percent of $Mo_2B$ and 10 wt. percent of $Ni_2B$. This provides a body with 85.2 wt. percent of Mo, 9.16 wt. percent of Ni, and 5.64 wt. percent of B, or 56.7 atomic percent of molybdenum, 10.2 atomic percent of nickel, and 33.1 atomic percent of boron.

*Example 3*

A body corresponding to composition 3 on the drawing was prepared by combining 90 wt. percent of $Mo_2B$ and 10 wt. percent of NiB. This produces a body with 85.2 percent of Mo, 8.45 wt. percent of Ni, and 6.35 wt. percent of B, or 55 atomic percent of molybdenum, 8.6 atomic percent of nickel, and 36.4 atomic percent of boron.

*Example 4*

A body corresponding to composition 4 on the drawing was prepared by combining 80 wt. percent of MoB and 20 wt. percent of Ni. This gives a body having 71.9 wt. percent of Mo, 20 wt. percent of Ni, and 8.1 wt. percent of B, or 40.7 atomic percent of molybdenum, 18.5 atomic percent of nickel, and 40.7 atomic percent of boron.

*Example 5*

A body corresponding to composition 5 on the drawing was prepared by combining 90 wt. percent of MoB and 10 wt. percent of NiB. This gives a body having 80.9 wt. percent of Mo, 8.45 wt. percent of Ni, and 10.65 wt. percent of B, or 42.6 atomic percent of molybdenum, 7.1 atomic percent of nickel, and 50.3 percent of boron.

*Examples 6–8*

Bodies corresponding to the compositions 6–8 on the diagram were prepared by first making the $Mo_2NiB_2$ compound as described above, and then combining with Mo or Mo and Ni (composition 8).

*Examples 9–11*

Bodies corresponding to compositions 9–11 were made by first making $Mo_2NiB_2$ and combining this compound with nickel or nickel and boron without additional molybdenum.

*Examples 12–15*

The bodies corresponding to compositions 12–15 on the drawing were made from $Mo_2B$ and various amounts of Ni, and/or $Mo_2NiB_2$. The weight percent and corresponding atomic percent of these compositions are as follows:

| Example | Weight Percent | | | Atomic Percent | | |
| --- | --- | --- | --- | --- | --- | --- |
| | Mo | Ni | B | Mo | Ni | B |
| 12 | 73.3 | 22.6 | 4.1 | 50 | 25 | 25 |
| 13 | 82.5 | 10.1 | 7.4 | 50 | 10 | 40 |
| 14 | 79.2 | 14.5 | 6.2 | 50 | 15 | 35 |
| 15 | 77.7 | 17.4 | 4.9 | 52 | 19 | 29 |

These products have an additional advantage in that they develop a liquid phase at temperatures below 1500° C., making them relatively easy to fabricate.

In forming cemented bodies by compacting and sintering treatments described above, the following alternative procedure may be followed with great advantage:

The compacted body is first pre-sintered at 800° C. for about thirty minutes under hydrogen. The pre-sintered body may then be readily machined to give it the desired shape, and after machining, it is finally sintered for one to three hours at 1250° C. to 1600° C. also under protective atmosphere. After it is so finally sintered, the body is extremely hard and its surface can be effectively machined only by grinding with diamond tools.

As an alternative to the procedure described above, the mixture of the ternary and binary boride powder particles may be hot-pressed in graphite dies at about 1400° C. to 1600° C. By way of example, a cemented body obtained by compacting and sintering a mixture of powder particles of $Mo_2NiB_2$ with $Mo_2B$, in proportions of 50 to 50% by weight, had the following properties: Hardness, 85 to 90 Rockwell A, transverse rupture strength 60,000 to 80,000 p. s. i., electrical resistivity, 65 microhm cm., and a corresponding high heat conductivity.

Tools containing ternary boride compounds are usually made as small tips which are fastened to steel shanks supporting them rigidly. This fastening can be done by mechanical clamping or by brazing with copper, or any standard silver, nickel or copper base brazing compound.

A unique advantage of the material of the present invention over tungsten carbide in tool applications, is that the brazing operation is exceedingly simple. No electrolytic coating of the tool tips with nickel or any other metal is required preparatory to brazing. In the brazing operation the thin shim of the brazing material is placed between the steel shank and the hard tool tip, and this assembly is heated in hydrogen somewhat above the melting point of the brazing material. The new hard refractory material is easily wetted by the conventional brazing material, such as copper or copper-silver alloys, and a hard and resilient bond is formed. A cutting tip of tungsten carbide cannot easily be brazed into a steel shank. It has first to be nickel-plated or otherwise subjected to some surface treatment before it can be brazed to a steel shank with an available brazing metal.

It will be readily understood that the discovery and manufacture of the new compounds $Mo_2NiB_2$ and $Mo_2CoB_2$ provide an exceptionally useful substitute for the scarce tungsten carbides. These new compounds not only have the hardness and cutting ability required, but also certain distinct advantages over the heretofore indispensible tungsten carbide.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

I claim:

1. A hard material of cemented particles having great strength suitable for cutting tool tips, 75% to 95% of the content of said material consisting of the ternary compound $Mo_2MeB_2$ and of the binary compound $Mo_2B$, where Me is a metal selected from the group consisting of nickel and cobalt, said ternary compound forming 75% to 25% of said content with the balance of said content being $Mo_2B$, the balance of said material consisting essentially of an alloy of Mo and of said Me, said material being substantially free of carbon.

2. A hard material of cemented particles having great strength suitable for cutting tool tips, 75% to 95% of the content of said material consisting of the ternary compound $Mo_2NiB_2$ and of the binary compound $Mo_2B$, said ternary compound forming 75% to 25% of said content with the balance of said content being $Mo_2B$, the balance of said material consisting essentially of an alloy of Mo and Ni, said material being substantially free of carbon.

3. A hard material of cemented particles having great strength suitable for cutting tool tips, 75% to 95% of the content of said material consisting of the ternary compound $Mo_2CoB_2$ and of the binary compound $Mo_2B$, said ternary compound forming 75% to 25% of said content with the balance of said content being $Mo_2B$, the balance of said material consisting essentially of an alloy of Mo and Co, said material being substantially free of carbon.

4. In a process of making a hard material of great strength suitable for cutting tool tips and having a hardness of about 87–90 Rockwell A, the steps comprising providing a mixture consisting of molybdenum and boron particles and an additional metal particle selected from the group consisting of nickel and cobalt in the following proportions:

| | Atomic percent |
|---|---|
| Molybdenum | 70–30 |
| Boron | 15–60 |
| Additional metal | 1–40 | subjecting said mixture of particles of the three named ingredients to pressure and to heat action which causes the molybdenum, boron and additional metal ingredients to combine in part into a ternary boride of molybdenum and said additional metal and in part into the binary boride $Mo_2B$.

5. In a process of making a hard material of great strength suitable for cutting tool tips and having a hardness of about 87–90 Rockwell A, the steps comprising providing a mixture consisting of molybdenum and boron particles and an additional metal particle selected from the group consisting of nickel and cobalt in the following proportions:

| | Atomic percent |
|---|---|
| Molybdenum | 70–30 |
| Boron | 15–60 |
| Additional metal | 1–40 | grinding said values together, cold-pressing the resultant, compacting the mixture of said different ingredients and sintering the compact at an elevated temperature to cause the molybdenum, boron and additional metal ingredients to combine in part into a ternary boride of molybdenum and said additional metal and in part into the binary boride $Mo_2B$.

6. In a process of making a hard material of great strength suitable for cutting tool tips and having a hardness of about 87–90 Rockwell A, the steps comprising providing a mixture consisting of molybdenum and boron particles and an additional metal particle selected from the group consisting of nickel and cobalt in the following proportions:

| | Atomic percent |
|---|---|
| Molybdenum | 70–30 |
| Boron | 15–60 |
| Additional metal | 1–40 | compacting the mixture of said different ingredients, subjecting the compacted body of said ingredients to a shaping operation, and thereafter sintering the shaped compact at an elevated temperature to cause the molybdenum, boron and additional metal ingredients of said compact to combine in part into a ternary boride of molybdenum and said additional metal and in part into the binary boride $Mo_2B$.

References Cited in the file of this patent

UNITED STATES PATENTS

| 589,161 | Chaplet | Aug. 31, 1897 |
|---|---|---|
| 1,913,373 | De Golyer | June 13, 1933 |
| 1,968,067 | Balke | July 31, 1934 |
| 1,993,598 | De Bats | Mar. 5, 1935 |
| 2,040,592 | Becker | May 12, 1936 |
| 2,084,349 | Laise | June 22, 1937 |
| 2,088,838 | Cole et al. | Aug. 3, 1937 |
| 2,113,353 | McKenna | Apr. 5, 1938 |
| 2,116,399 | Marth | May 3, 1938 |
| 2,221,286 | Hensel et al. | Nov. 12, 1940 |

OTHER REFERENCES

Iron Age, April 29, 1948, pages 80 and 81. (Copy in Patent Office Library.)